(12) United States Patent
Polk

(10) Patent No.: US 10,959,397 B2
(45) Date of Patent: Mar. 30, 2021

(54) COLLAPSABLE SHELTER

(71) Applicant: Christopher Polk, Arvada, CO (US)

(72) Inventor: Christopher Polk, Arvada, CO (US)

( * ) Notice: Subject to any disclaimer, the term of this patent is extended or adjusted under 35 U.S.C. 154(b) by 283 days.

(21) Appl. No.: 16/269,683

(22) Filed: Feb. 7, 2019

(65) Prior Publication Data
US 2019/0239471 A1 Aug. 8, 2019

Related U.S. Application Data

(60) Provisional application No. 62/627,851, filed on Feb. 8, 2018.

(51) Int. Cl.
*A01K 1/02* (2006.01)
*A01K 1/03* (2006.01)

(52) U.S. Cl.
CPC .......... *A01K 1/0245* (2013.01); *A01K 1/029* (2013.01); *A01K 1/033* (2013.01)

(58) Field of Classification Search
CPC ...... A01K 1/0245; A01K 1/029; A01K 1/033; E04H 15/48; E04H 15/30; E04H 15/14; E04H 15/46; B65D 21/00; B65D 21/02; B65D 21/0204
See application file for complete search history.

(56) References Cited

U.S. PATENT DOCUMENTS

| 5,803,018 A * | 9/1998 | Liou | A01K 31/08 |
| | | | 119/461 |
| 9,980,461 B2 * | 5/2018 | Kim | A01K 1/033 |

\* cited by examiner

*Primary Examiner* — Timothy D Collins
*Assistant Examiner* — Brittany A Lowery
(74) *Attorney, Agent, or Firm* — Scott L. Terrell, P.C.; Scott L. Terrell

(57) ABSTRACT

A collapsible shelter is provided. The shelter has a concave top panel with front, back, and side walls. A concave bottom panel is has front, back and side walls. At least three of the bottom panel side walls have an inner stepped flanged portion. The flanged portions are positioned in a vertical stepped relationship with respect to each one of the other one of the flanged portions. Trapezoidal front, back, and side wall panels have top edges and bottom edges. The bottom edges are longer than the top edges. The bottom edges are pivotally attached, at a bottom edge thereof, to a respective one of each one of the flanged portions so that each one of the trapezoidal wall panels are capable of being pivotally deployed outwardly between an open box-shaped shelter configuration, the top edges of each one of said wall panels being connected to a respective one of each of said top panel side walls, and a closed nested configuration where each one of the trapezoidal side wall panels are disconnected from the top panel side walls, and folded inwardly in a stacked relationship for stowage within the concave portion of the bottom panel. The front panel includes a door an latch assembly.

6 Claims, 11 Drawing Sheets

COLLAPSABLE SHELTER

CROSS REFERENCE TO RELATED APPLICATIONS

None

STATEMENT OF FEDERALLY SPONSORED RESEARCH

Not Applicable.

BACKGROUND OF THE INVENTION

1. Field of the Invention

The present invention generally relates to collapsible shelters. In particular, it relates to an insulated collapsible pet crate being adapted for stowage in a nested-suit-cased folded type configuration.

2. Description of the Related Art

Pets shelters are commonly used to confine pets in the home and in transport. In transport, high temperatures in the pet carriers are often a source of distress to the pets when contained, for example, in an overly heated motor vehicle without proper ventilation. To combat such heat and distress, and in an attempt to lower temperatures within pet carriers, many of prior art devices include enclosures with apertures openings, such as a wire mesh window or door. These openings help to circulate the air flow through the interior of a motor vehicle, and allow for cooler air to enter the carrier. A second example would be in during the cold of winter when transporting pets inside vehicles or in pet carriers secured in truck beds. To combat such cold extremes, and in an attempt to raise or maintain temperatures within pet carriers, many of prior art devices have resorted to external blanket wraps or internal blanketing.

Other prior art devices include pet carriers having fans, electro-mechanical devices, as well as other types of air conditioning units offer some utility, but are expensive, complicated in construction, difficult in stowage, and complicated in design. The present invention overcomes these deficiencies.

BRIEF SUMMARY OF THE INVENTION

It is therefore an object of the present invention to provide a collapsible shelter. In particular, it is an object of the present invention to provide an insulated collapsible pet crate being adapted for stowage in a suit-cased housing.

To overcome the problems of the prior art, and in accordance with the purpose of the invention, as embodied and broadly described herein, briefly, a collapsible shelter is provided. The shelter has a concave top panel with front, back, and side walls. A concave bottom panel is has front, back and side walls. At least three of the bottom panel side walls have an inner stepped flanged portion. The flanged portions are positioned in a vertical stepped relationship with respect to each one of the other one of the flanged portions. Trapezoidal front, back, and side wall panels have top edges and bottom edges. The bottom edges are longer than the top edges. The bottom edges are pivotally attached, at a bottom edge thereof, to a respective one of each one of the flanged portions so that each one of the trapezoidal wall panels are capable of being pivotally deployed outwardly between an open box-shaped shelter configuration, the top edges of each one of said wall panels being connected to a respective one of each of said top panel side walls, and a closed nested configuration where each one of the trapezoidal side wall panels are disconnected from the top panel side walls, and folded inwardly in a stacked relationship for stowage within the concave portion of the bottom panel. The front panel includes a door an latch assembly.

BRIEF DESCRIPTION OF THE SEVERAL VIEWS OF THE DRAWINGS

The accompanying drawings, which are incorporated in and which constitute a part of the specification, illustrate at least one embodiment of the invention and, together with the description, explain the principles of the invention through illustration to persons of skill in the art.

DETAILED DESCRIPTION OF THE DRAWINGS

Figure 1:
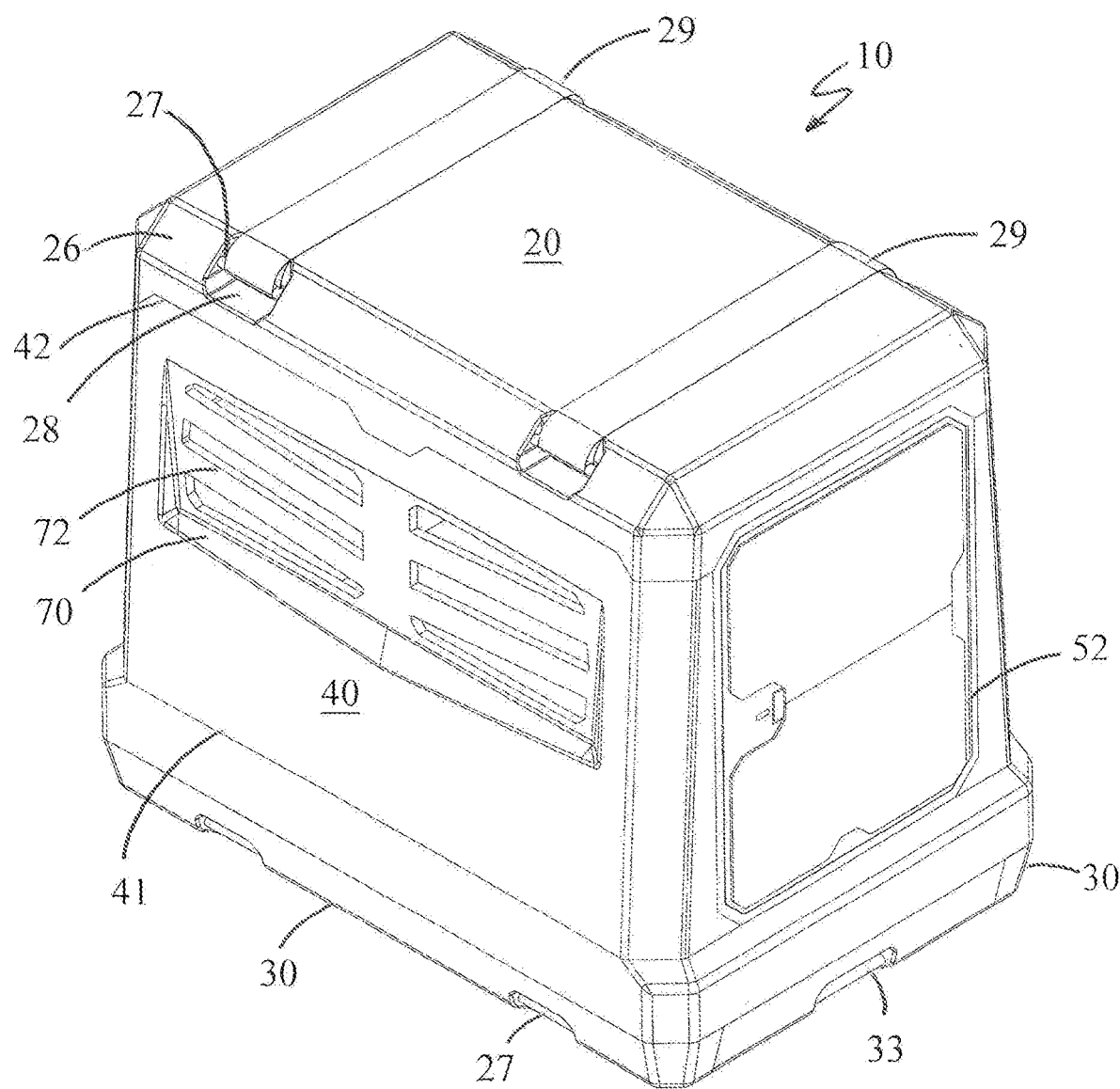
FIG. 1 is an isometric SW view of the present invention deployed for use as a pet crate.
Figure 2:
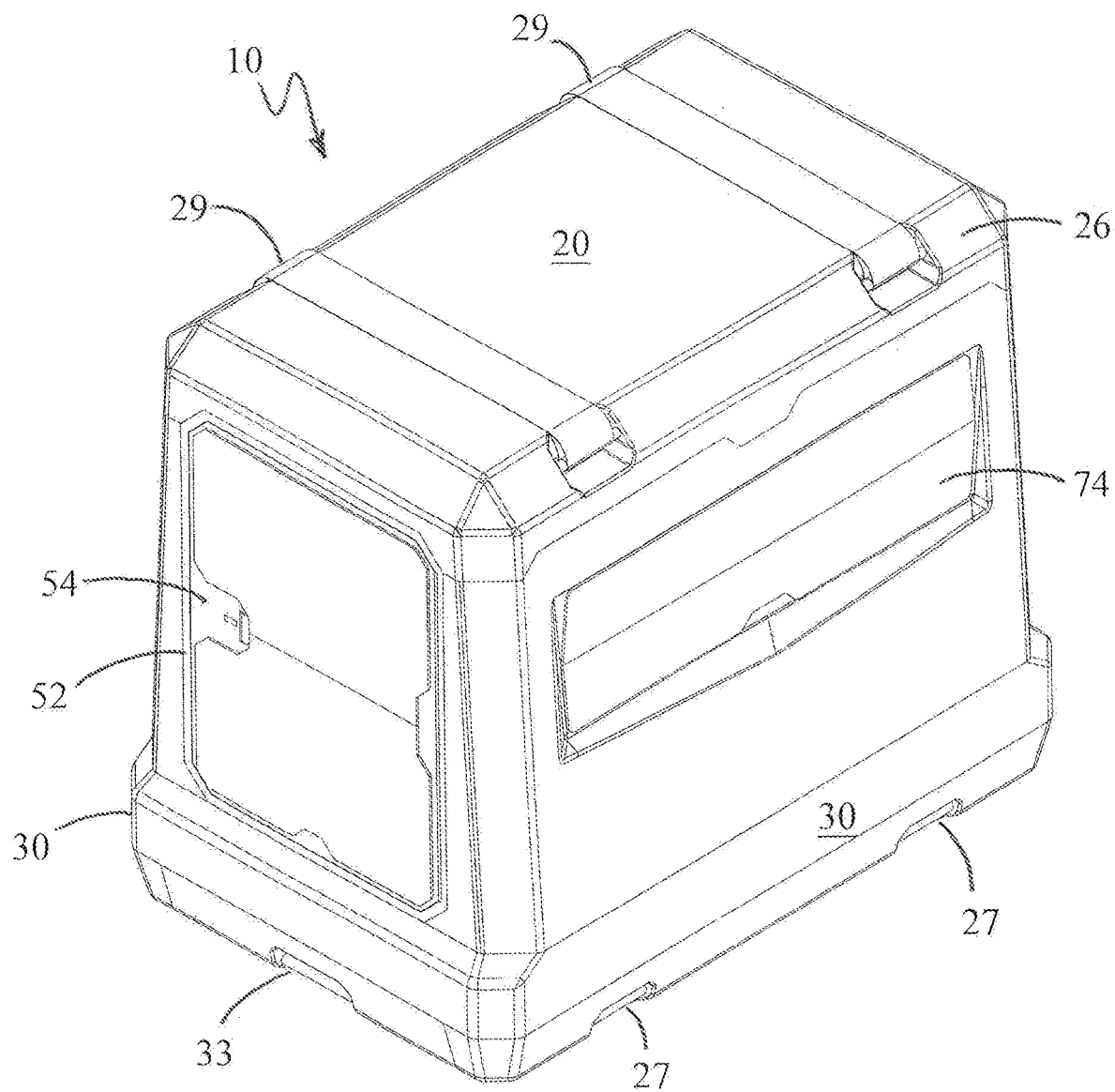
FIG. 2 is an isometric SE view of the present invention deployed for use as a pet crate.
Figure 3:
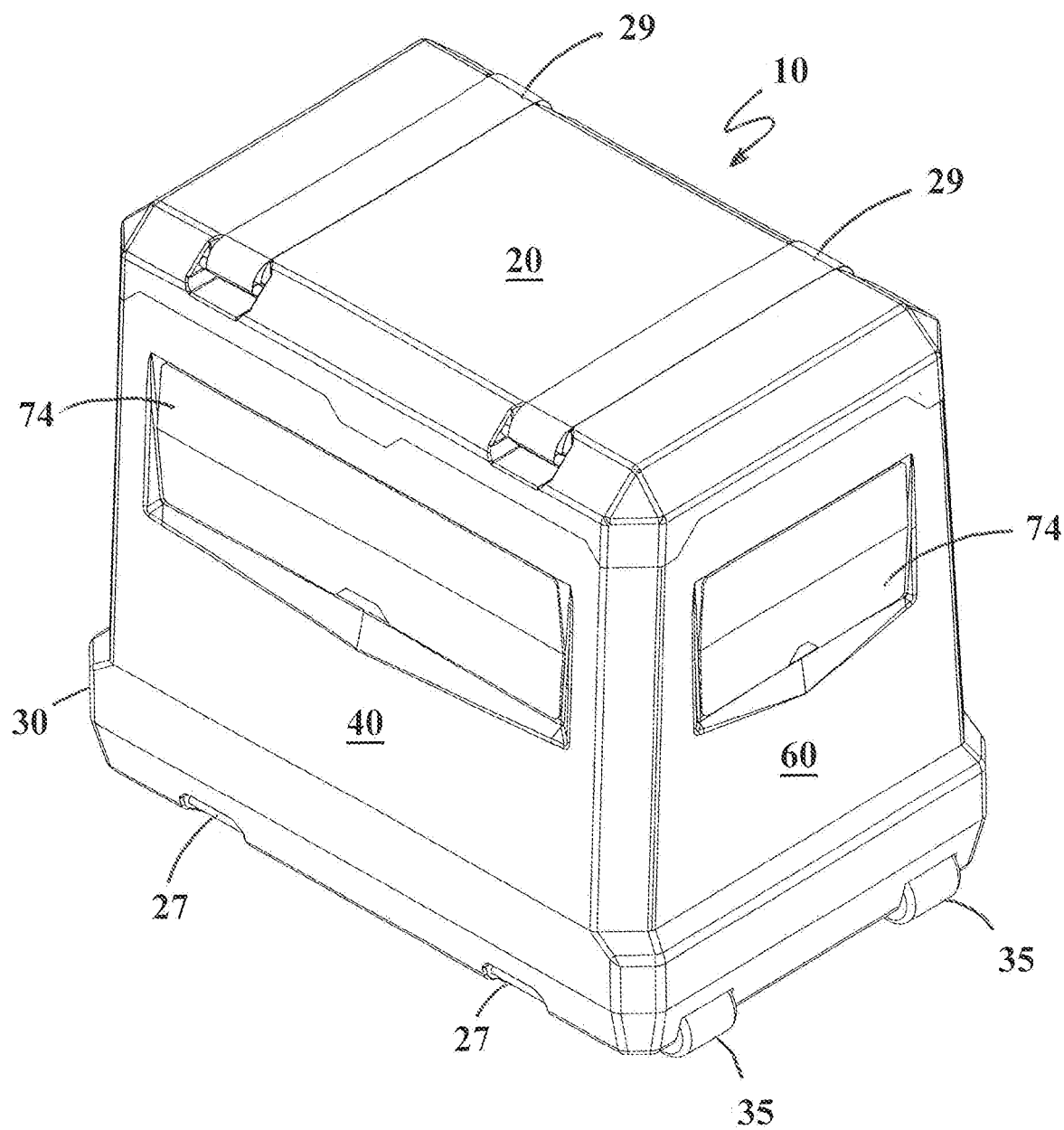
FIG. 3 is an isometric NE view of the present invention deployed for use as a pet crate.
Figure 4:
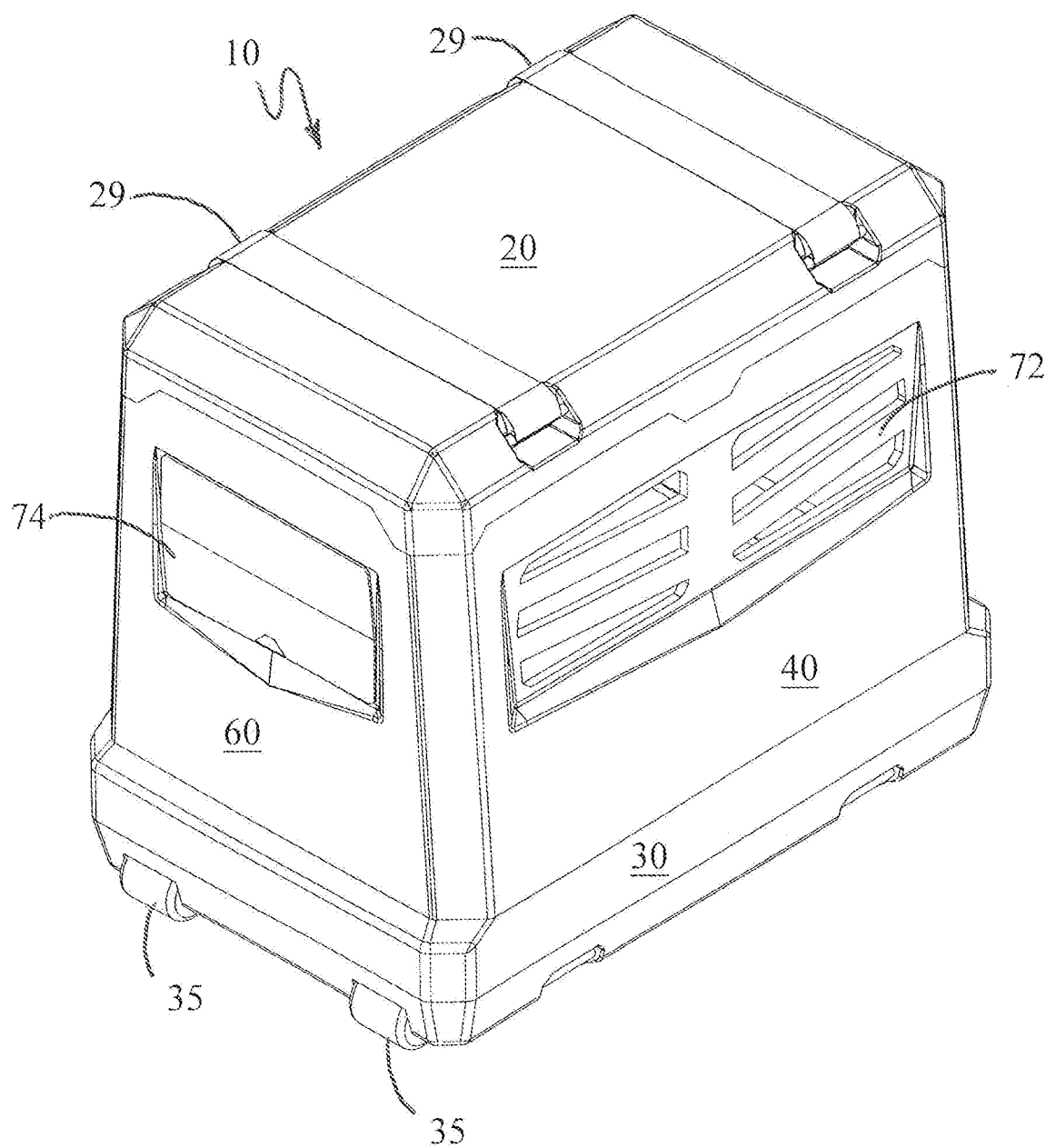
FIG. 4 is an isometric NW view of the present invention deployed for use as a pet crate.
Figure 5:
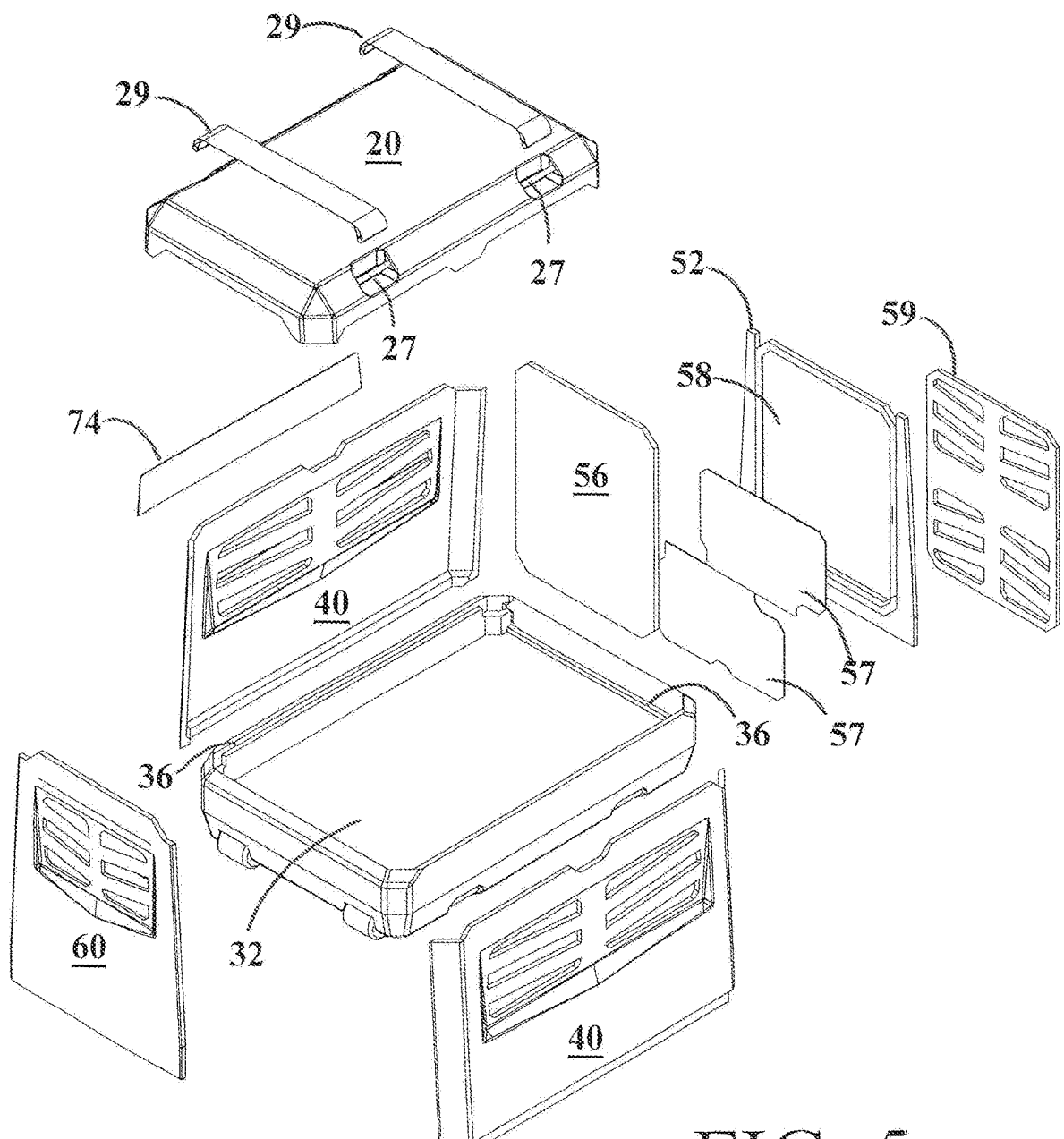
FIG. 5 is an isometric NW exploded view of the component parts of the presently preferred embodiment of the present invention
Figure 6:
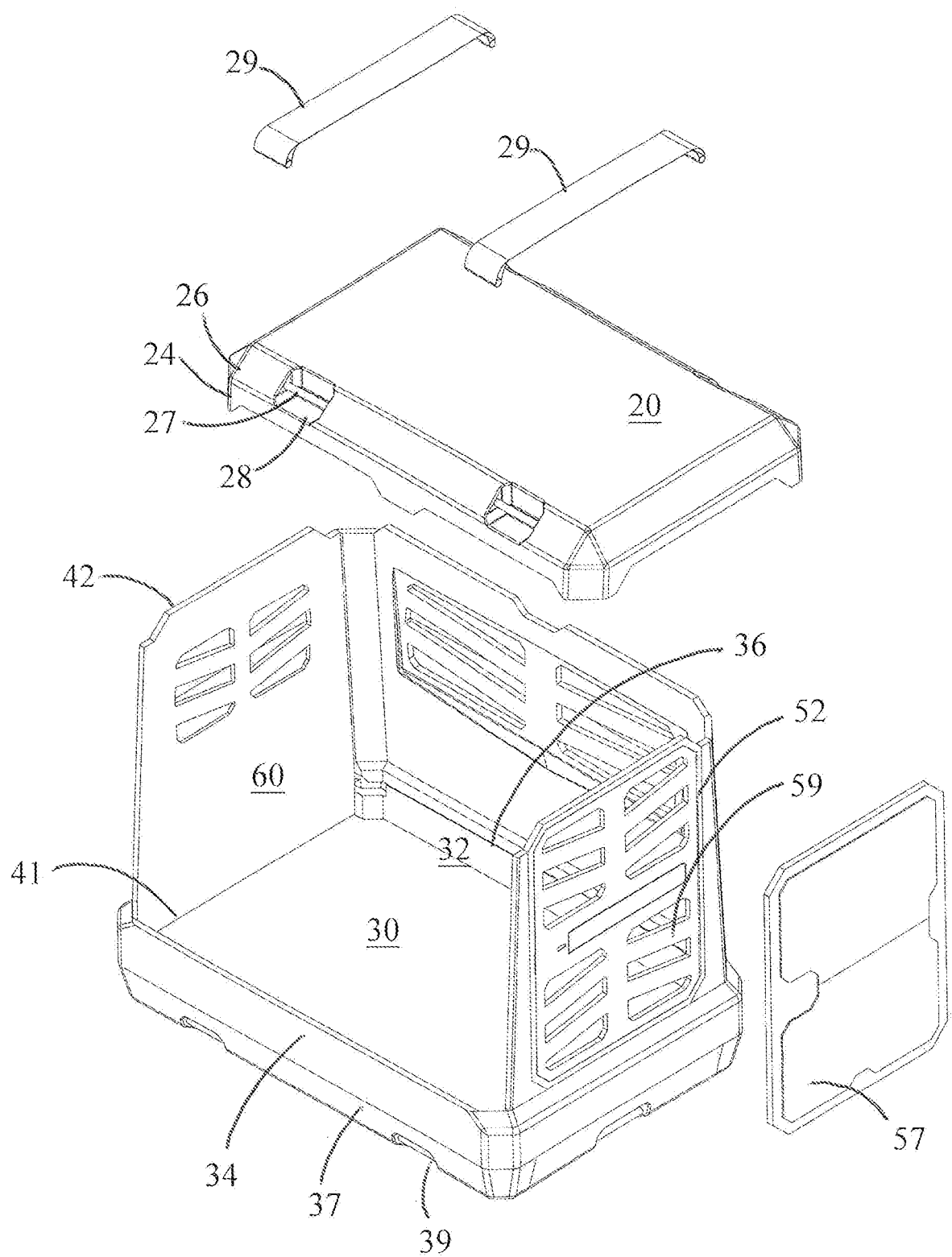
FIG. 6 is an isometric SW exploded view of the component parts of the presently preferred embodiment of the present invention.
Figure 7:
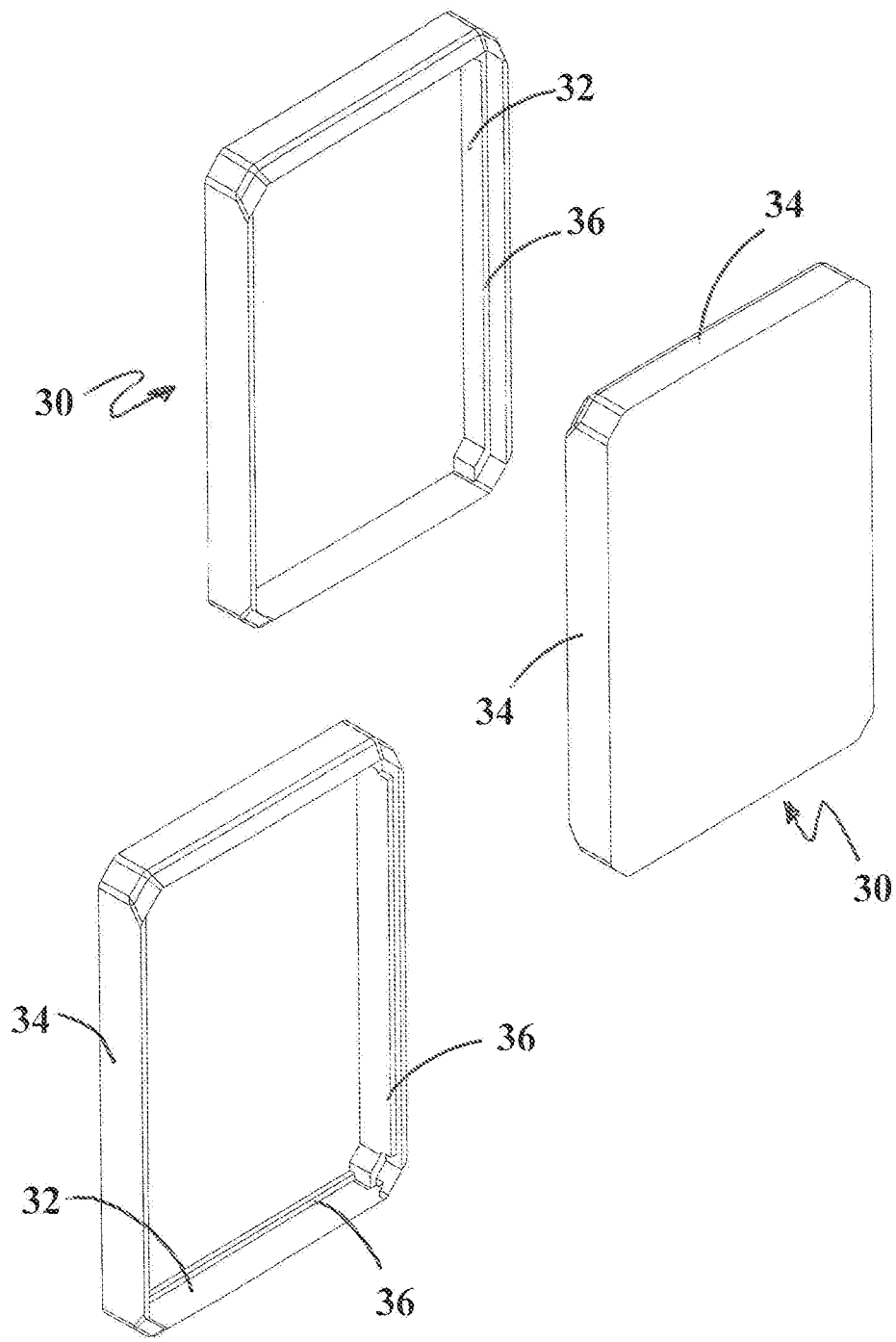
FIG. 7 shows three isometric views of the bottom panel of the present invention. These views illustrate the flanged portions of the inner side walls being configured as stepped in height to support the respective trapezoidal sidewalls when stowed in a folded configuration.

Unless specifically defined otherwise, all scientific and technical terms, used herein, have the same ordinary meaning as would be commonly understood by one of ordinary skill in the art to which this invention belongs.

Although any methods and materials similar or equivalent to those described herein, can be used in the practice or testing of the present invention, the preferred methods and materials are now described. Reference will now be made in detail, to the presently preferred embodiments of the invention, including the examples of which are illustrated in the accompanying drawings. In the drawings, like numerals will be used in order to represent like features of the present invention.

The present invention provides a collapsible shelter 10. The shelter 10 is a folded configuration for transportation and stowage in a nested arrangement. The shelter 10 is preferably a pet crate, but may be configured in any size being suitable for sheltering any animate or inanimate person, or object, from the elements of an external environment. The shelter 10 may be constructed of any raw materials including plastic or metal sheets, in a single or double walled construction. In a presently preferred embodiment that shelter 10 is an assembly of double walled construction. The double walled top 20, bottom 30, side 40, front 50, and back 60 panels, are desirably formed using any method which is well known in the art, including rotational molding, extrusion, or any or those additive manufacturing methods including fused deposition modeling and 3D printing or polymer substrates. As such, the shelter 10 when constructed as a double walled construction functions as an insulted, hollow walled, panel structure. The hollow walled panels may be formed of any materials, and, of any methods, which are well known, included those methods for the rotationally or injection molding of polymer substrate materials. Moreover, all, or a single component part of, the present invention may be formed of any printable substrate, such as a malleable metal or polymer, material which is capable of being a built-up additive member being generated using a computer-aided-design process.

Referring now to the drawing figures, the shelter 10 has a rectangular concave top panel 20. The top panel 20 has inner 22 and outer 24 sidewalls. The outer sidewalls 24 have lateral edge portions 26 which have at least a pair of oppositely aligned clip receiving formations 28 In the presently preferred embodiment, the clip receiving formations 28 are a lateral void with a horizontal pin 27. In use, the lateral edge portions 26 interlock with the top sides 42 of the trapezoidal sidewalls 40, and flexible horizontal clips 29 transverse the top panel 20 and clip onto the pinned formations to secure the top panel 20 to the trapezoidal sidewalls 40.

Shelter 10 has trapezoidal front 50, back 60, and lateral sidewalls 40. The trapezoidal sidewalls 40 have parallel bottom 41 and top sides 42. The bottom side 41 is longer than the top side 42. The trapezoidal sidewalls 40 are desirably hollow insulated panels with window openings 70. In the presently preferred pet-crate-configuration, the window openings 70 include cross bars 72. The window openings 70 may, but need not, have shutters 74 pivotally attached to adjustably open and close the window openings 70. The bottom sides 41, of the trapezoidal sidewalls 40, are pivotally attached, with a hinge (not shown) to the inner surface 32 of the bottom panel 30, so that the trapezoidal sidewalls 40 are capable of being folding into the inner cavity of the bottom panel 30 for stowage. In this manner, top panel 20 is then fastened, with clips 29 to the bottom panel 30, so that the entire shelter is contained in a suit-cased type of arrangement 14.

Shelter 10 has a rectangular concave bottom panel 30. The concave bottom panel 30 has inner 32 and an outer 34 side walls. The outer 34 sidewalls may, but need not, also have lateral edge portions 37 which have at least another pair of oppositely aligned clip receiving formations 39. In the presently preferred embodiment, the clip receiving formations 37, of the bottom panel 30 are also a lateral void with a horizontal pin 27. In this manner, as above, when the bottom panel 30 and top panel 20 are connected with the strap clips 29 to contain the trapezoidal front 50, back 60 and sidewalls 40 for stowage in the suit-cased configuration 14.

Inner walls 32 of the bottom panel 30 are configured as a horizontally spaced series relationship, of increasingly-in-height, stepped flange portions 36. The flanged potions 36 are adjacent to, and pivotally connected with, each of the respective one of each of the bottom edges, of each one, of the respective trapezoidal front 50, back 60, and sidewalls 40. As above, the flanged portion 36, as a series of horizontally increasingly in height, are configured so that the trapezoidal front 50, back 60, and sidewalls 40 are capable of being stowed in a folding stacked arrangement 14, when the shelter 10 is not in use.

In a presently preferred embodiment, the bottom panel 30 includes a pair of axel and wheeled assembles 35, and an oppositely aligned handle 33, so that when stowed in a suit-cased configuration 14 the shelter 10 is easily moved about by pulling and rolling. The handle 33 may, but need not be, an extensible assembly of any configuration which is well known in the art.

Figure 8:
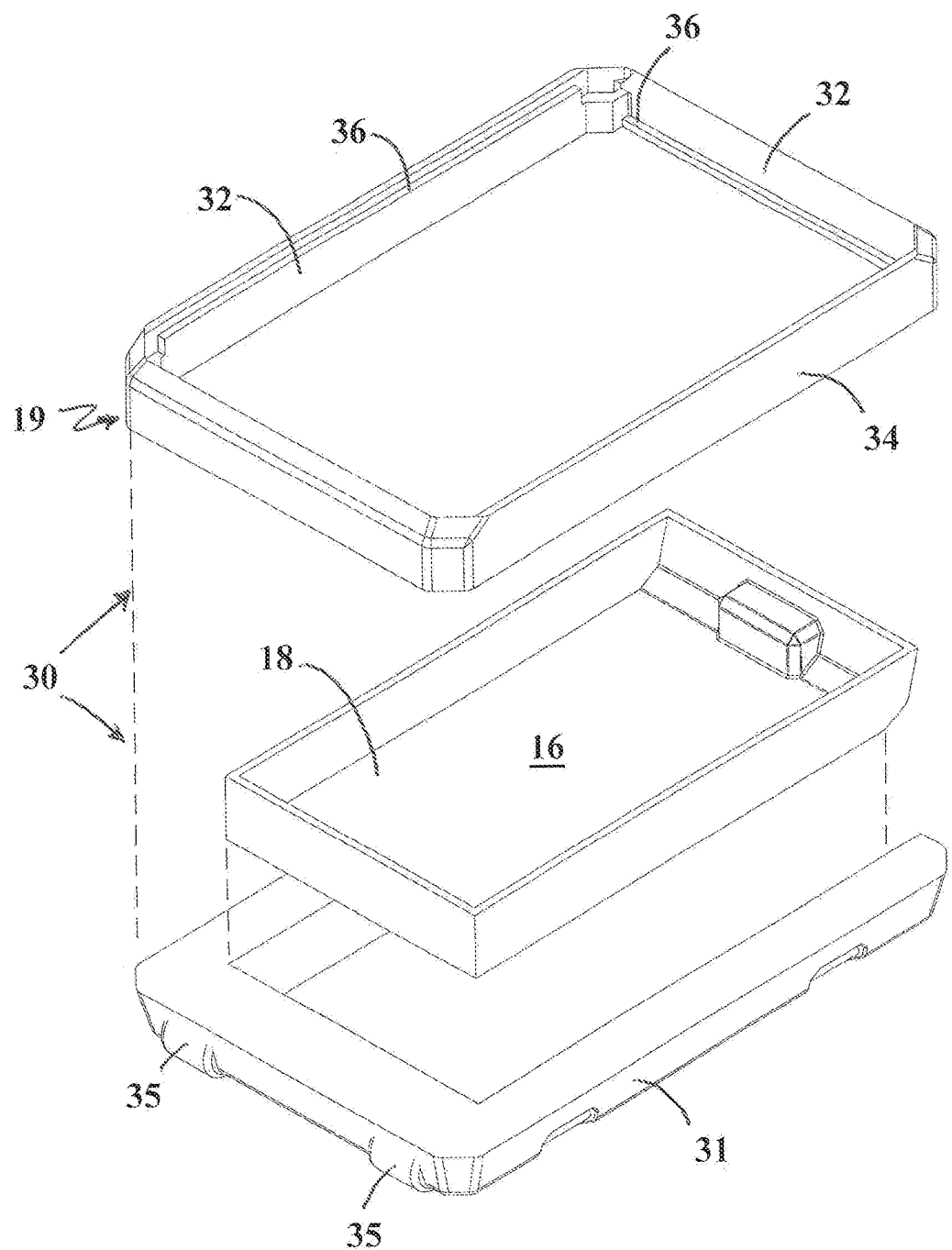
FIG. 8 is an isometric NW view of a presently preferred embodiment of the present invention where the bottom panel is configured to receive a tray.
Figure 9:
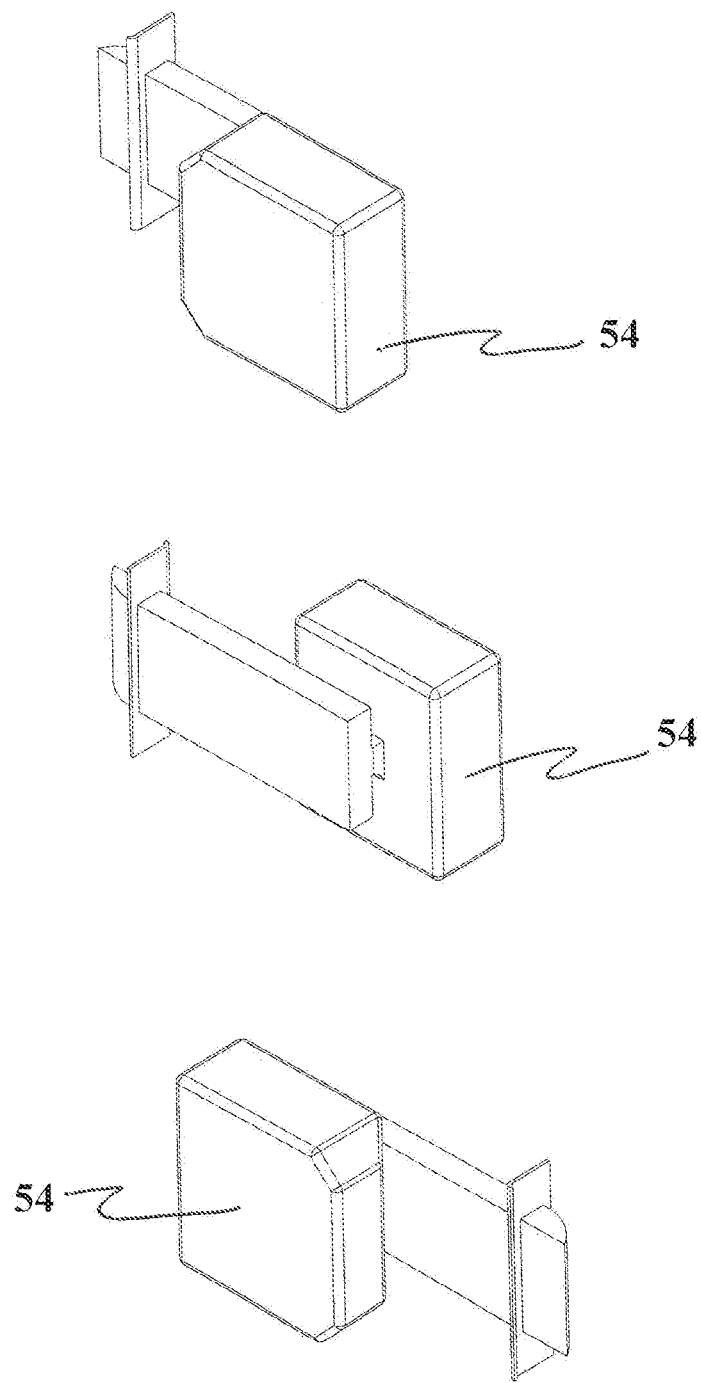
FIG. 9 shows three isometric view of the presently preferred latch assembly.

Referring now to FIG. 8, in an even more presently preferred embodiment, where in a horizontal sectional view of bottom panel 30 is shown, the bottom panel 30 is configured as an upper four-sided-frame 19, a lower three-sided-frame 31, and a tray 16 assembly, so that the inner surface 18 of tray 16, is easily removed, by and outward sliding engagement, for cleaning. The upper four-sided-frame includes the plurality of horizontally-stepped flange portions 36.

Trapezoidal front panel 50 has a door frame 52 and latch assembly 54. A door 56 is pivotally attached to the door frame 52, in any manner which is well known. When deployed for use, the top sides 42 of the trapezoidal sidewalls 40 are secured to the top panel 20 with a clip 39 fastener. As above, the door 56 may, but need not, also have a window 58 opening with cross braces 59, and pivotally attached shutters 57.

Figure 10:
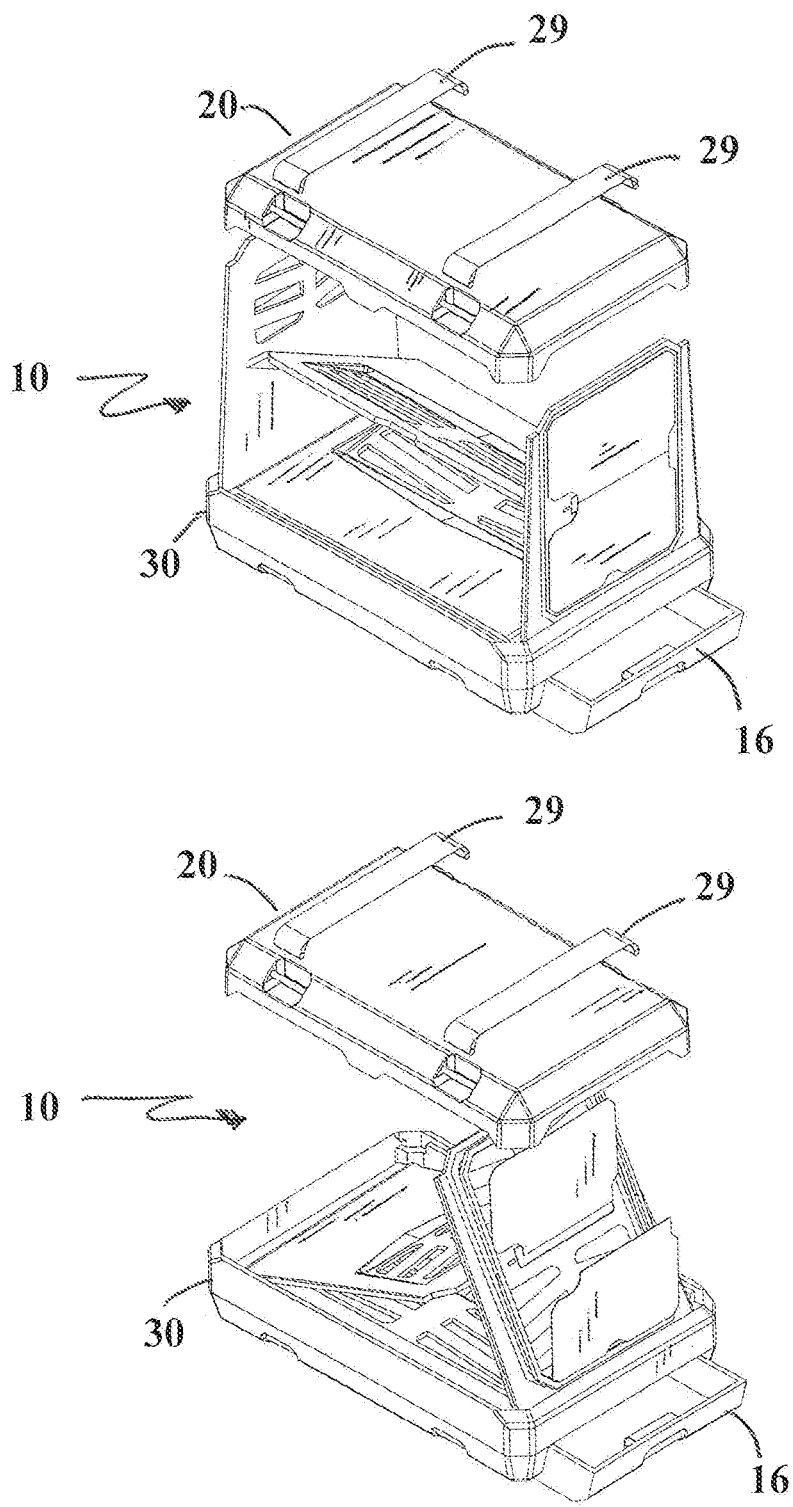
FIG. 10 shows an exploded SW views of the presently preferred invention where the sidewalls (top figure) and front and back walls (bottom figure) are folded inward for storage.
Figure 11:
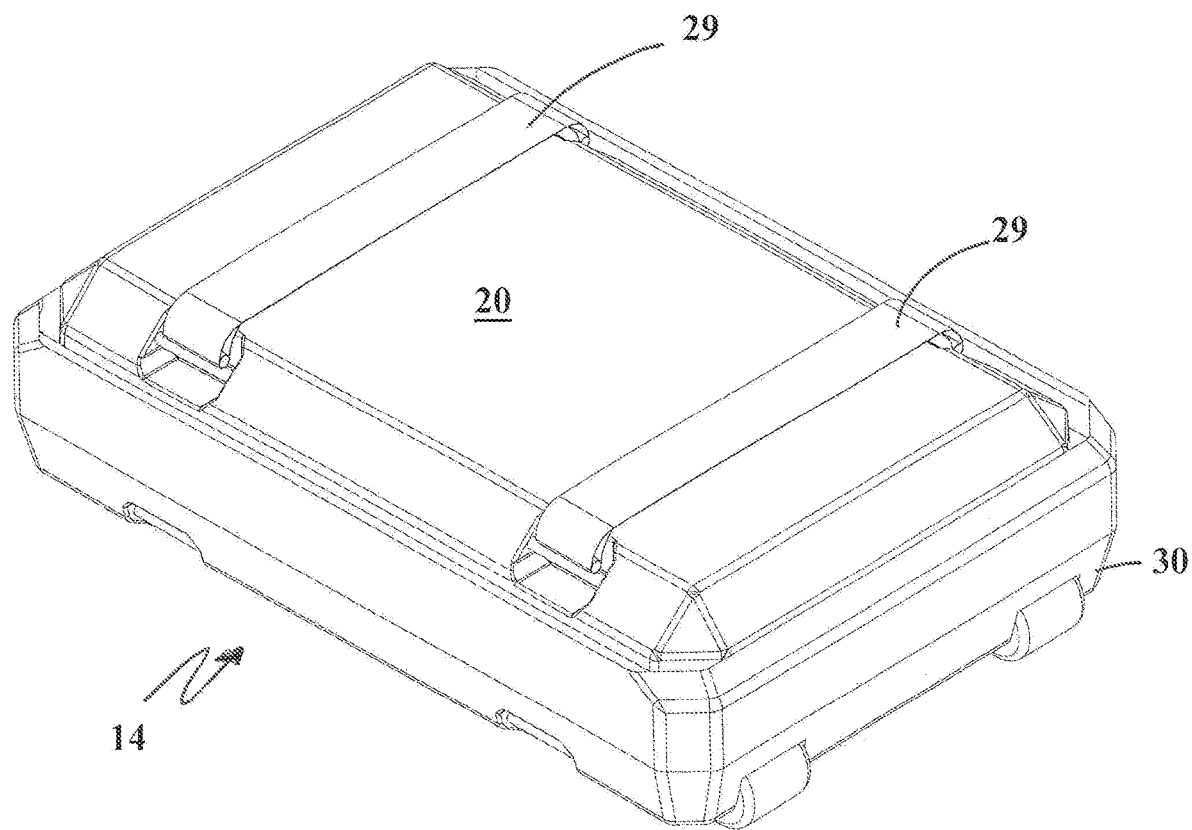
FIG. 11 is a NE isometric view of the present invention collapsed for transport or stowage in a suit-cased configuration.

Turing now to FIG. 10, the shelter 10 is a foldable and collapsible shelter 10, which when collapsed for travel or stowage, becomes a suit-cased configured 14 container with, or without, wheeled assemblies 35 and an extensible handle 33 for transport. The top 20 and bottom 30 panels are secured, in the presently preferred embodiment, with strap clips 39 extending over the top panel 20 and being clipped to the pin formations 27, in the clip receiving formations 28, formed in the lateral edges 37 of the outer surface of the bottom panel 30. In use, from a suit cased collapsed configuration 14, when opening the collapsed suit-cased use, the clips 29 are removed, the top panel 20 is separated from the bottom panel 30, and the trapezoidal sides 40 are sequentially folded outwardly and upwardly to a substantially vertical orientation. The top side of the trapezoidal front 50, back 60 and sidewalls 40 are positioned to interlock in tight fitment with the adjacent inner surfaces 22 of the top panel. The top panel 20 is then secured with the clip straps 29. The shelter 10 may then be used, for any intended purpose, and is collapsed for transport or stowage in a reversed sequence, of the above steps.

Additional advantages of the present invention will be set forth in the description that follows, and in part will be obvious from that description or can be learned or appreciated from practice of the invention. Moreover, the advantages of the invention can be realized and obtained by the invention as more particularly pointed out in the appended claims.

The invention claimed is:
1. A collapsible shelter, comprising:
(a) a concave top panel having front, back, and side walls;
(b) a concave bottom panel having front, back and side walls, at least three bottom side walls having an inner stepped flanged portion, said flanged portions being positioned in a vertical stepped relationship with respect to each one of the other one of said flanged portions;

(c) a trapezoidal front, back, and side wall panels, each of said trapezoidal side wall panels having a top edge and a bottom edge, said bottom edge being longer than said top edge, and each of said trapezoidal side wall panels, being pivotally attached, at a bottom edge thereof, to a respective one of each one of said flanged portions so that said each one of said trapezoidal wall panels are capable of being pivotally deployed outwardly between an open box-shaped shelter configuration, the top edges of each one of said wall panels being connected to a respective one of each of said top panel side walls, and folded inwardly, each one of said trapezoidal wall panels being disconnected from said top panel side walls, so that the trapezoidal side wall panels are stacked within a concave portion of said concave bottom panel for stowage in a nested relationship;

(d) a door frame and latch assembly in said front trapezoidal side panel;

(e) a door pivotally attached to said door frame; and (f) a means for releasably fastening said side wall panels to said top panel.

2. The collapsible shelter according to claim 1, wherein said top panel side walls include at least one pair of oppositely aligned clip receiving formations.

3. The collapsible shelter according to claim 1, wherein the fastening means is selected from a group consisting of a clip or a strap.

4. The collapsible shelter according to claim 1, further comprising, at least one grated window opening in at least one of said trapezoidal side wall panels.

5. The collapsible shelter according to claim 1, wherein said bottom panel is an assembly comprising an upper frame, a lower three sided frame, and a tray, said upper frame including said flange portions, and said tray adapted for slidable engagement within said lower frame.

6. The collapsible shelter according to claim 1, wherein said bottom panel side walls include at least one pair of oppositely aligned clip receiving formations.

* * * * *